(12) United States Patent
Chiu et al.

(10) Patent No.: US 6,359,406 B1
(45) Date of Patent: Mar. 19, 2002

(54) THREE-PHASE DIRECTION-CURRENT (DC) BRUSHLESS MOTOR WITH HALL ELEMENTS

(75) Inventors: Hsien-Lin Chiu, Taipei; Shih-Ming Huang, TaoYuan Shien, both of (TW)

(73) Assignee: Delta Electronics Inc. (TW)

( * ) Notice: Subject to any disclaimer, the term of this patent is extended or adjusted under 35 U.S.C. 154(b) by 0 days.

(21) Appl. No.: 09/704,754

(22) Filed: Nov. 3, 2000

(51) Int. Cl.⁷ .................................................. H02P 7/50
(52) U.S. Cl. ........................ 318/439; 318/138; 318/254; 318/439; 318/560; 318/700; 318/732; 318/800; 318/801; 388/800
(58) Field of Search ................................. 318/254, 700, 318/732, 800, 801, 138, 439, 560

(56) References Cited

U.S. PATENT DOCUMENTS

| | | | | |
|---|---|---|---|---|
| 4,568,190 A | * | 2/1986 | Miyazaki et al. | 318/254 |
| 4,760,315 A | * | 7/1988 | Nanae et al. | 318/254 |
| 5,150,030 A | * | 9/1992 | Ito et al. | 318/811 |
| 5,160,873 A | * | 11/1992 | Tukiyama et al. | 318/254 |
| 5,969,489 A | * | 10/1999 | Itou et al. | 318/254 |
| 5,990,651 A | * | 11/1999 | Iwazawa et al. | 318/685 |

* cited by examiner

*Primary Examiner*—Robert E. Nappi
*Assistant Examiner*—Tyrone Smith
(74) *Attorney, Agent, or Firm*—Troxell Law Office PLLC

(57) ABSTRACT

Disclosed is an improved three-phase direct-current (DC) brushless motor with Hall elements, in which two Hall elements instead of three Hall elements are placed upon the driving circuit of the DC brushless motor to sense the variation of the magnetic flux during the operation so as to reduce the manufacturing cost and also improve the operation precision.

6 Claims, 4 Drawing Sheets

THREE-PHASE DIRECTION-CURRENT (DC) BRUSHLESS MOTOR WITH HALL ELEMENTS

BACKGROUND OF THE INVENTION

1. Field of the Invention

The present invention generally relates to an improved three-phase direct-current (DC) brushless motor with Hall elements, and more particularly, to a three-phase DC brushless motor in which the required voltage for the driving circuit is obtained by use of suitable arrangement of the Hall elements with the circuit.

2. Description of the Prior Art

The structure of a DC brushless motor is different from that of a typical DC motor in that the former is the inside-out design of the latter. In an "inside-out" design of a DC brushless motor, the rotating portion, i.e., the rotor, is on the outside of the stator. The stationary portion, i.e., stator, is formed by the inside of the machine and is inserted down the axis of the dipole field. The cylindrical rotor contains an array of identical permanent magnets that provide a uniform dipole field. The windings of the motor are placed in or on the stator. The stator windings are then "switched" or "commutated" to provide a DC motor/generator much the same as in a conventional DC motor.

The operation mode of a DC brushless motor is also different from that of a typical DC motor in that the commutation of the former can be performed by electronic means using switching circuits and the latter by mechanical means using brushes. Therefore, the undesired problems related to mechanical structure can be overcome by replacing the mechanical means with electronic means such as power semiconductor devices or ICs for signal processing so as to control the three-phase current of the DC motor and achieve better operation characteristics.

Please refer to FIG. 1, which shows a circuit diagram illustrating one embodiment of a DC brushless motor in the prior art. In the drawing, a DC brushless motor 1 is a bidirectional motor connected to a control circuit 6 through a Hall element signal line 5, wherein the control circuit 6 outputs a plurality of switching signals required for a driving circuit 7. Since the DC brushless motor 1 is a three-phase control unit, it is connected to the driving circuit 7 at a first terminal 2, a second terminal 3, and a third terminal 4. As can be seen in FIG. 1, the required control signals for the conventional embodiment of the driving circuit 7 are a set of three-phase control signals $R_L$, $R_U$, $S_L$, $S_U$, $T_L$, and $T_U$, which lead to magnetic flux through a magnet on the rotor inside the DC brushless motor 1 induced by three Hall elements and output an induced voltage into the control circuit 6.

FIG. 2 shows a functional block diagram illustrating one embodiment in the prior art. In the drawing, there are provided three Hall elements, namely Hall element I 21, Hall element II 22, and Hall element III 23. With the three Hall elements properly connected to a first motor driving circuit 20, the magnitude of the magnetic field 24 between the stator and the rotor and the variation of the magnetic flux during the operation of the DC brushless motor are detected so as to obtain the induced voltages $V_A$, $V_B$, and $V_C$. The induced voltages $V_A$, $V_B$, and $V_C$ are input into the first motor driving circuit 20, which outputs the control voltage signals to the DC brushless motor.

As mentioned above, it is known that in the prior art three Hall elements are utilized to complete the operation of a DC brushless motor. However, there is a need for improved precision and manufacturing cost. In order to meet the requirement for higher precision and lower manufacturing cost, a better design for improvement has been proposed.

SUMMARY OF THE INVENTION

It is therefore the primary object of the present invention to provide an improved three-phase direct-current (DC) brushless motor with Hall elements, in which two Hall elements instead of three Hall elements are used to sense the variation of the magnetic flux during the operation of the DC brushless motor so as to reduce the manufacturing cost and also improve the efficiency of the motor.

To accomplish the foregoing object, the present invention provides an improved three-phase DC brushless motor utilizing two Hall elements placed upon the driving circuit so as to sense the variation of the magnetic flux during the operation of the DC brushless motor and output a voltage induced by the variation of the magnetic flux to the driving circuit, wherein the driving circuit controls the DC brushless motor by the induced voltage.

It is preferable that a third voltage required for the driving circuit to control the DC brushless motor is obtained by sampling and processing the voltages induced respectively by the two Hall elements.

It is preferable that the two Hall elements are placed upon the driving circuit and the arrangement of the Hall elements forms a angle with respect to the rotor inside the DC brushless motor.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention provides an improved three-phase DC brushless motor with Hall elements, in which two Hall elements instead of three Hall elements are placed upon the driving circuit of the DC brushless motor to sense the variation of the magnetic flux during the operation so as to reduce the manufacturing cost and also improve the operation precision.

Figure 1:
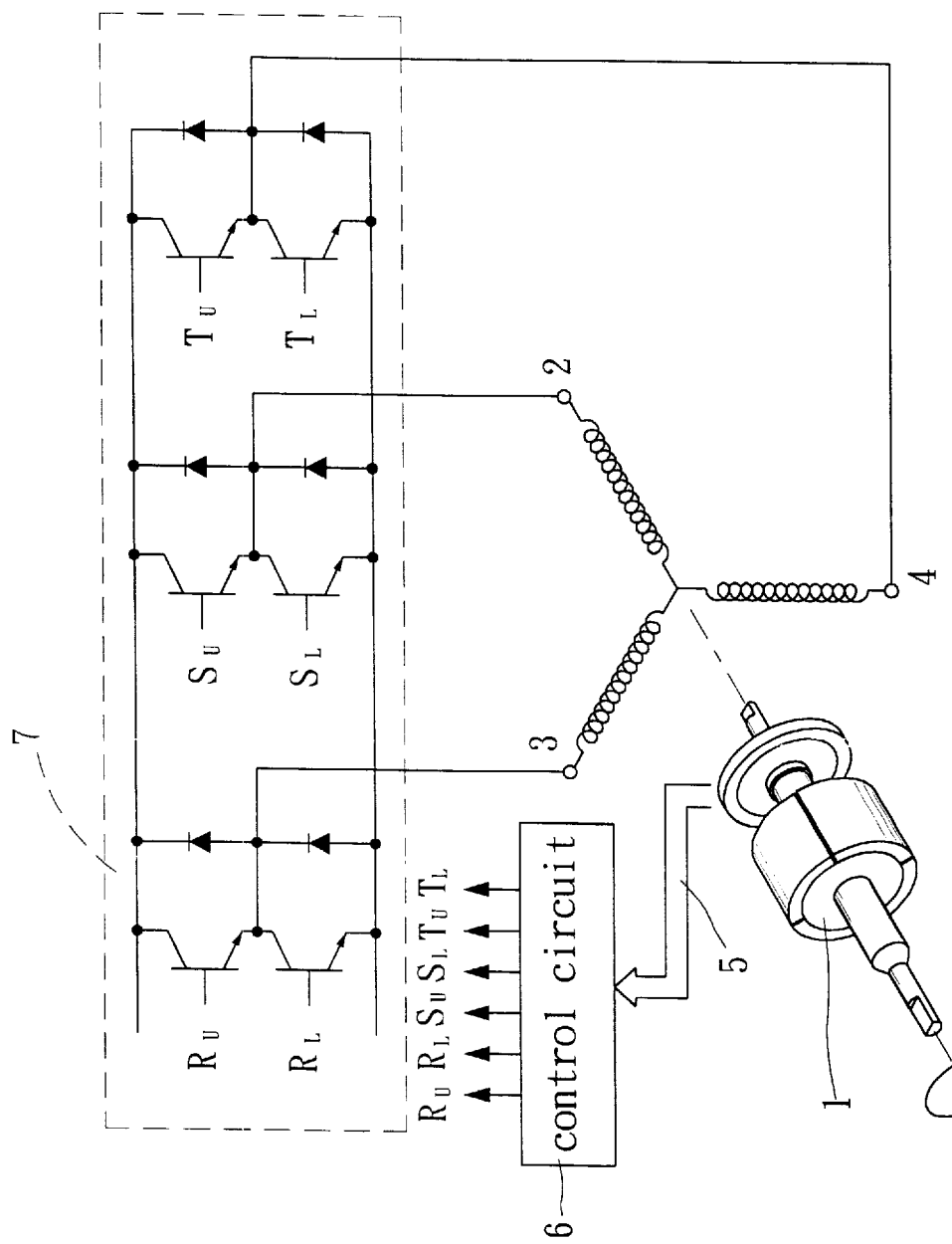
FIG. 1 shows a circuit diagram illustrating one embodiment of a DC brushless motor in the prior art.
Figure 2:
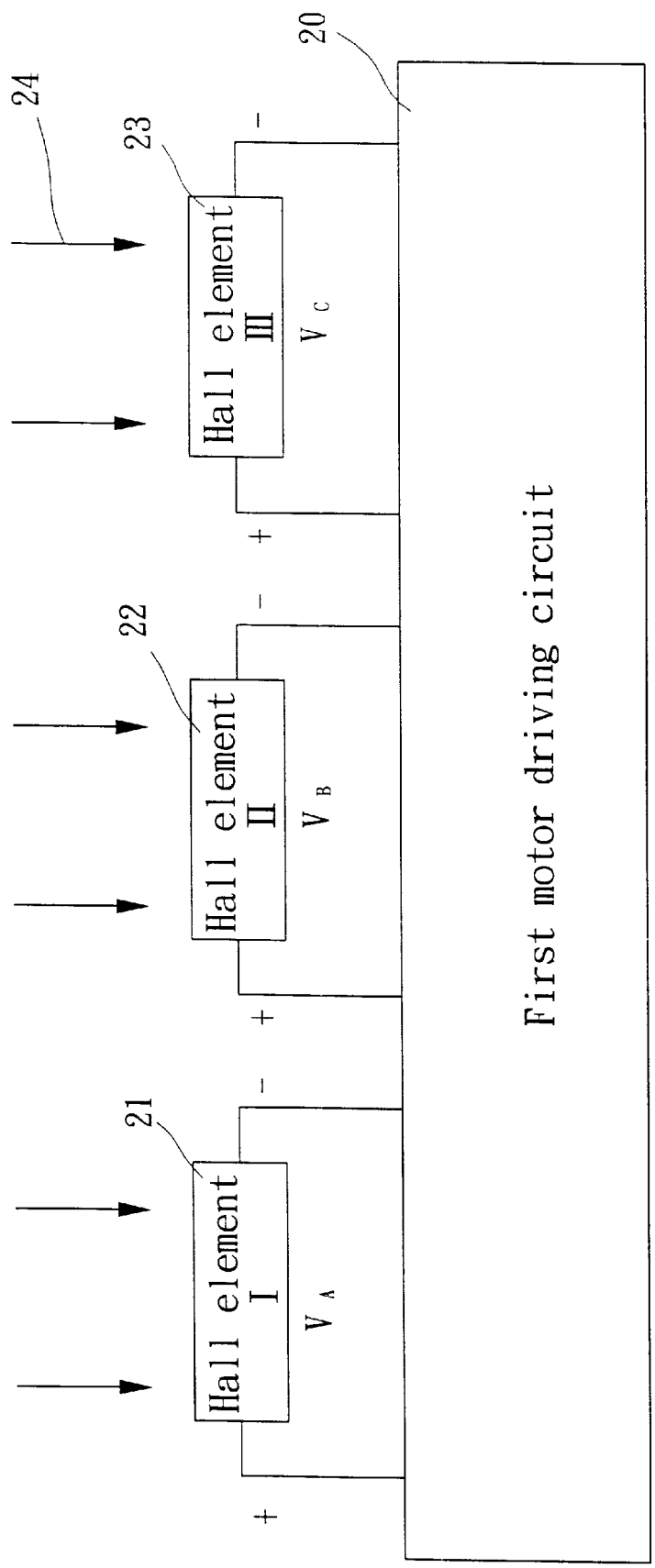
FIG. 2 shows a functional block diagram illustrating one embodiment of a DC brushless motor in the prior art.
Figure 3:
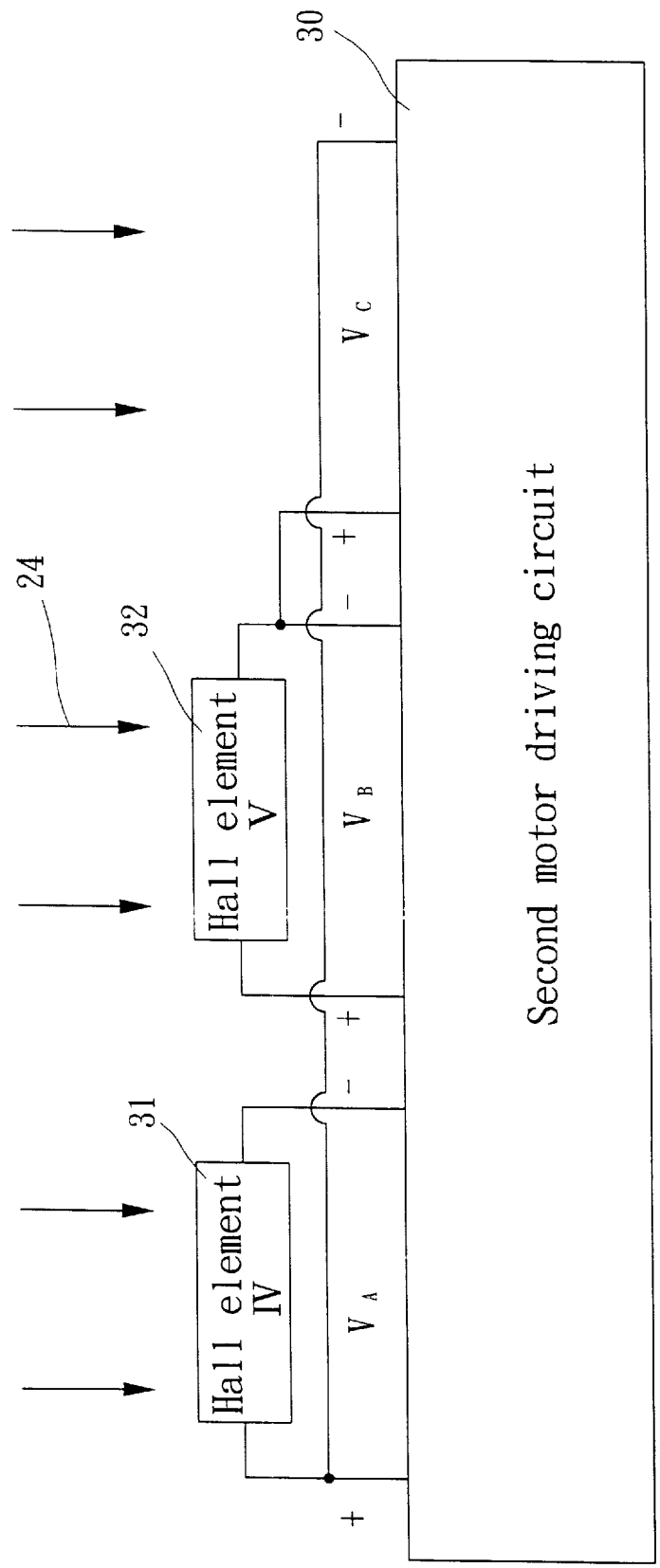
FIG. 3 shows a functional block diagram illustrating one embodiment of a DC brushless motor in accordance with the present invention.

Please refer to FIG. 3, which shows a functional block diagram illustrating one embodiment of a DC brushless motor in accordance with the present invention. In the drawing, there are provided two Hall elements, namely Hall element IV 31, Hall element V 32, wherein said Hall element IV 31 and said Hall element V 32 are induced by the external sinusoidal magnetic field to generate induced voltages $V_A$, $V_B$ respectively. Said Hall element IV 31 and said Hall element V 32 are further connected to a second motor driving circuit 30, wherein said second motor driving circuit 30 receives the voltages $V_A$, $V_B$ generated respectively by said Hall element IV 31 and said Hall element V 32 induced by the external sinusoidal magnetic field. A third voltage $V_C$ required for the driving circuit to control the DC brushless motor is obtained by sampling and processing the voltages induced respectively by said two Hall elements.

The voltages $V_A$, $V_B$ are generated respectively by said Hall element IV 31 and said Hall element V 32 induced by the external sinusoidal magnetic field. The can be obtained by the following relations.

$$V_A = K \times I \times B \times \sin(wt+120°) \quad (1)$$

$$V_B = K \times I \times B \times \sin(wt+240°) \quad (2)$$

wherein K is a constant, I represents the input current into the Hall elements, and B represents the peak value of the magnetic flux density. Therefore, the induced voltage $V_A$ is obtained by the product of a constant K, I (the input current into the Hall element I), and the magnetic flux density B sensed by the Hall element I. Similarly, the induced voltage $V_B$ is obtained by the product of a constant K, I (the input current into the Hall element II), and the magnetic flux density B sensed by the Hall element II. Furthermore, a third voltage $V_C$ can be obtained by using the following equation:

$$V_A + V_B + V_{C-O}$$

or $$KIB\sin(wt+120°) + KIB\sin(wt+240°) + KIB\sin(wt+360°) = 0 \quad (3)$$

wherein $V_C = KIB\sin(wt+360°)$ and $$V_C = -(V_A + V_B)$$

By applying to the processing circuit, the third induced voltage $V_C$ can be obtained with Hall element IV and Hall element V placed upon the driving circuit. In other words, the third induced voltage $V_C$ is obtained by the potential difference of the positive potential of said first Hall element and the negative potential of said second Hall element is the third phase voltage. The positive potential of the induced voltage of said first Hall element is processed into the negative potential of the third phase voltage, and the negative potential of the induced voltage of said second Hall element is processed into the positive potential of the third phase voltage.

Figure 4:
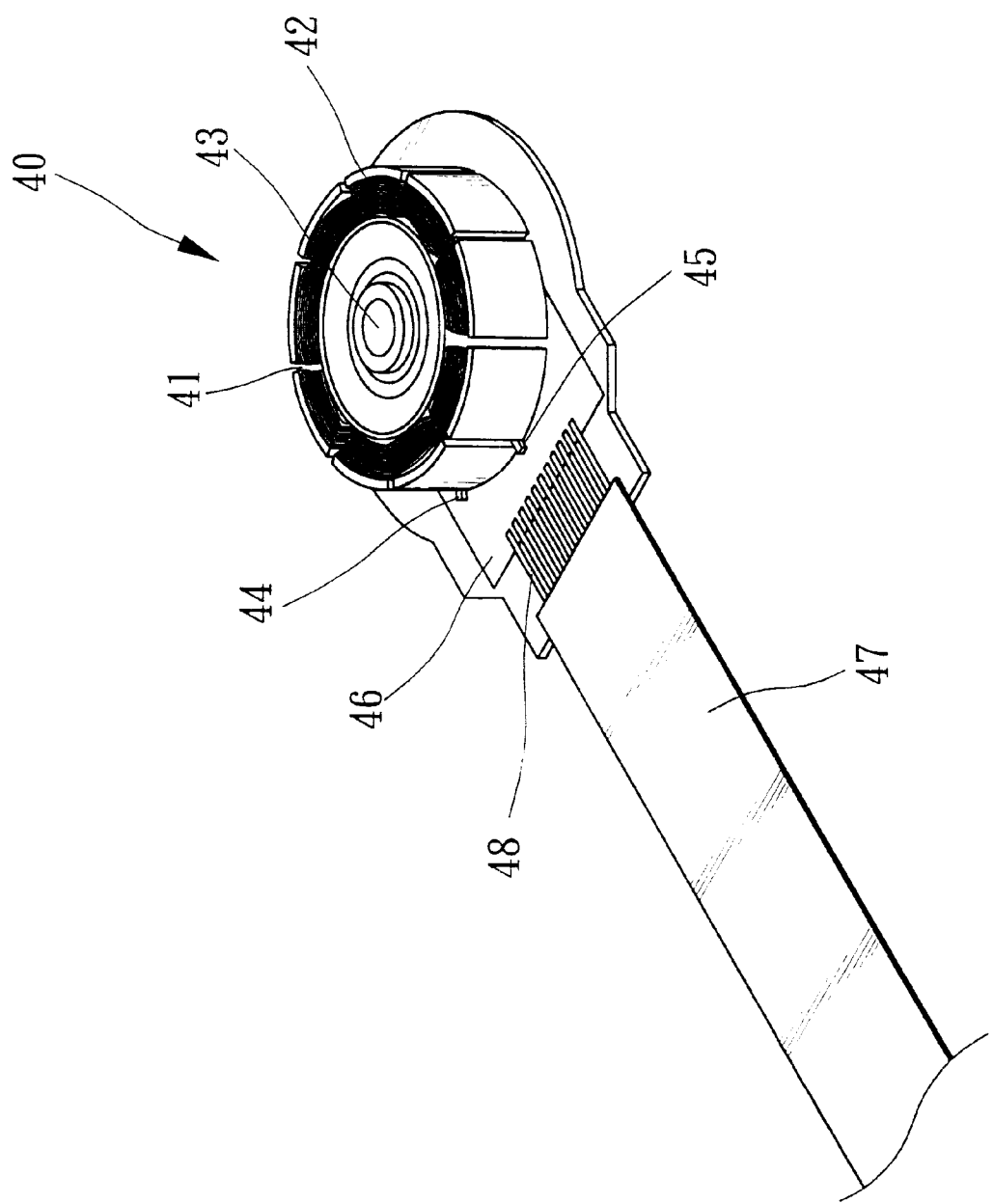
FIG. 4 shows a diagram illustrating a three-dimensional structure of the preferred embodiment in accordance with the present invention.

Please refer to FIG. 4, which shows a diagram illustrating a three-dimensional structure of the preferred embodiment in accordance with the present invention. The structure of the motor 40 comprises a brushless motor 41 including a plurality of stator slots 42 on the inside and two Hall elements, namely Hall element I 44 and Hall element II 45, on the outside. Said Hall element I 44 and said Hall element II 45 are placed upon a driving circuit 46 so as to sense the variation of the magnetic flux and output a voltage induced by the variation of the magnetic flux to the driving circuit 46, wherein the driving circuit controls the brushless motor 41 by the induced voltage.

As seen in FIG. 4, the brushless motor 41 is a three-phase DC brushless motor and the number of the stator slots is multiple of 3. The arrangement of Hall element I 44 and Hall element II 45 placed upon the driving circuit forms a angle of 120 degrees with respect to the rotor 43 inside the DC brushless motor.

As discussed so far, in accordance with the present invention, there is provided an improved three-phase DC brushless motor with Hall elements, in which two Hall elements instead of three Hall elements are placed upon the driving circuit of the DC brushless motor to sense the variation of the magnetic flux during the operation so as to reduce the manufacturing cost and also improve the operation precision. Consequently, the present invention has been examined to be progressive and has great potential in commercial applications.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An improved three-phase direct-current (DC) brushless motor with Hall elements, comprising:
   a driving circuit for driving said brushless motor; and
   a first Hall element and a second Hall element placed upon said driving circuit so as to sense the variation of the magnetic flux during the operation of said DC brushless motor and output a third voltage induced by the variation of the magnetic flux to said driving circuit, to control said DC brushless motor by the induced voltage, wherein the potential difference of a positive potential of said first Hall element and a negative potential of said second Hall element is the third voltage.

2. The improved three-phase DC brushless motor as recited in claim 1, wherein the arrangement of said first and second Hall elements placed upon said driving circuit forms an angle with respect to the rotor inside the DC brushless motor, so as to correctly sense the magnitude of magnetic field.

3. The improved three-phase DC brushless motor as recited in claim 1, wherein the magnetic field of the rotor inside the DC brushless motor is sinusoidal.

4. The improved three-phase DC brushless motor as recited in claim 3, wherein the induced voltage generated by said first Hall element is obtained by the product of a constant K, the input current into said first Hall element, and the magnetic flux density B sensed by said first Hall element, and the induced voltage generated by said second Hall element is obtained by the product of a constant K, the input current into said second Hall element and the magnetic flux density B sensed by said second Hall element.

5. The improved three-phase DC brushless motor as recited in claim 4, wherein the induced magnetic flux density B is a sinusoidal function of the magnetic field of the rotor inside the DC brushless motor.

6. The improved three-phase DC brushless motor as recited in claim 1, wherein the positive potential of the induced voltage of said first Hall element is processed into the negative potential of the third phase voltage, and the negative potential of the induced voltage of said second Hall element is processed into the positive potential of the third phase voltage.

* * * * *